United States Patent
Moulinet

[19]

[11] Patent Number: 5,228,664
[45] Date of Patent: Jul. 20, 1993

[54] CONTROLLED-RIGIDITY DEVICE FOR MECHANICAL FORCE TRANSMISSION

[75] Inventor: François Moulinet, Triel sur Seine, France

[73] Assignee: Glaenzer Spicer, Poissy, France

[21] Appl. No.: 806,122

[22] Filed: Dec. 12, 1991

[30] Foreign Application Priority Data

Dec. 28, 1990 [FR] France ............................ 90 16501

[51] Int. Cl.⁵ ...................... F16F 7/12; F16D 3/68
[52] U.S. Cl. ............................. 267/141.1; 248/632; 248/634; 267/280; 464/83
[58] Field of Search ................. 267/141.1, 152, 153, 267/280, 294; 248/632, 634; 464/81, 83

[56] References Cited

U.S. PATENT DOCUMENTS

| | | | |
|---|---|---|---|
| 1,850,210 | 3/1932 | Krotee | 464/83 X |
| 1,860,744 | 5/1932 | Krotee | 464/83 X |
| 2,012,012 | 8/1935 | Kitzman | 64/96 |
| 3,512,768 | 5/1970 | Reed et al. | 267/152 |

FOREIGN PATENT DOCUMENTS

| | | |
|---|---|---|
| 2620162 | 11/1977 | Fed. Rep. of Germany . |
| 3031234 | 3/1982 | Fed. Rep. of Germany . |
| 3843496 | 4/1990 | Fed. Rep. of Germany . |
| 1278090 | 10/1961 | France . |
| 1305906 | 10/1962 | France . |
| 1367974 | 6/1964 | France . |
| 1547971 | 10/1968 | France . |
| 58-46240 | 3/1983 | Japan . |
| 377454 | 7/1932 | United Kingdom . |
| 648516 | 1/1951 | United Kingdom ............... 267/294 |
| 1099390 | 1/1968 | United Kingdom . |

*Primary Examiner*—Allan D. Herrmann
*Attorney, Agent, or Firm*—Harness, Dickey & Pierce

[57] ABSTRACT

There is provided a device for the mechanical transmission of forces between a first input element and a second output element, characterised in that it comprises an input member (12) connected to the first element, an output member (14) connected to the second element and a force transmission block (16) which is interposed between these two block members (12, 14) and is capable of experiencing elastic deformation under the action of the compressive forces exerted on it by the two members when these are displaced relative to one another in the main force transmission direction (X—X), and in that it comprises a controlled means (24) for varying the rigidity of the force transmission block (16) in the main direction (X—X) by exerting a control force (FC) on it.

15 Claims, 2 Drawing Sheets

CONTROLLED-RIGIDITY DEVICE FOR MECHANICAL FORCE TRANSMISSION

FIELD OF THE INVENTION

The present invention relates to a device for the mechanical transmission of forces between a force input element and a force output element.

The invention relates more particularly to a device for the transmission of forces or torques, of the type in which an elastically deformable transmission block is interposed between the two elements.

BACKGROUND AND SUMMARY

There are many known versions of such devices, in which the transmission block has constant intrinsic characteristics. These are particularly shock mounts or elastic bolsters and elastic couplings in which the material of the transmission block or transmission blocks is, for example, an elastomeric material.

Such devices are passive devices, that is to say their force transmission behaviour varies only as a function of the value of the forces or torques which they have to transmit.

The object of the present invention is to provide a version of a force transmission device which is active, that is to say the force transmission behaviour of which can be varied.

To achieve this, the invention provides a device for the mechanical transmission of forces between a first input element and a second output element, characterised in that it comprises an input member connected to the first element, an output member connected to the second element and a transmission block which is interposed between these two members and is capable of experiencing elastic deformation under the action of the compressive forces exerted on it by the two members when these are displaced relative to one another in the main force transmission direction, and in that it comprises controlled means for varying the rigidity of the transmission block in the said main direction by exerting a control force on it.

According to other characteristics of the invention:
the control force is exerted on the transmission block in a direction different from the said main direction;
the transmission block comprises two plane opposite end faces which each interact respectively with the input member and the output member, the direction of the control force being substantially parallel to the said end faces;
the transmission block comprises at least one central layer of elastically deformable material, to the opposite faces of which are fastened two rigid end plates which delimit the said end faces of the transmission block;
the transmission block comprises a stack of layers of elastically deformable material, between which rigid plates are arranged;
each layer of elastically deformable material is a thin layer of elastomeric material, and each rigid plate is a metal plate adhesively bonded to the elastomeric material;
the two end faces of the elastically deformable transmission block are in abutment against two mutually confronting reaction surfaces of the device, the device comprising a wedge-shaped control-force exertion member which penetrates into the transmission block in order to bring about the putting under compression, by a wedging effect, of the two opposite parts of the transmission block, each of which is delimited, on the one hand, by one of the two end faces of the transmission block and, on the other hand, by the corresponding inclined face of the control-force exertion member;
the two inclined faces of the control-force exertion member form the same angle relative to the main force transmission direction;
the control-force exertion member is interposed between two rigid plates of the transmission block.

In its use for transmitting a torque, the device according to the invention is characterised in that the input member and the output member are mounted movably in rotation relative to one another, in that each of the two members comprises at least one tab which is offset radially relative to the common axis of rotation and which extends opposite the corresponding tab of the other of the two members, and in that at least one controlled-rigidity transmission block is arranged between the two mutually confronting faces of the two associated tabs.

According to other characteristics of the invention:
each of the two input and output members comprises a series of tabs distributed uniformly about the axis, the tabs of each of the two members being of equal number and alternating with one another, and transmission blocks being arranged between the mutually confronting faces of each of the pairs of tabs associated with the two members;
the control-force exertion member is a member capable of being displaced axially relative to the two members, in order to vary the control force, and it comprises a series of wedges, each of which penetrates into a transmission block; or
the control-force exertion member comprises a plurality of wedges, each of which penetrates radially into a transmission block, and means for displacing the wedges simultaneously.

BRIEF DESCRIPTION OF THE DRAWINGS

Other characteristics and advantages of the invention will emerge from a reading of the following detailed description, for an understanding of which reference will be made to the accompanying drawings, in which.

DESCRIPTION OF THE PREFERRED EMBODIMENT

Figure 1:
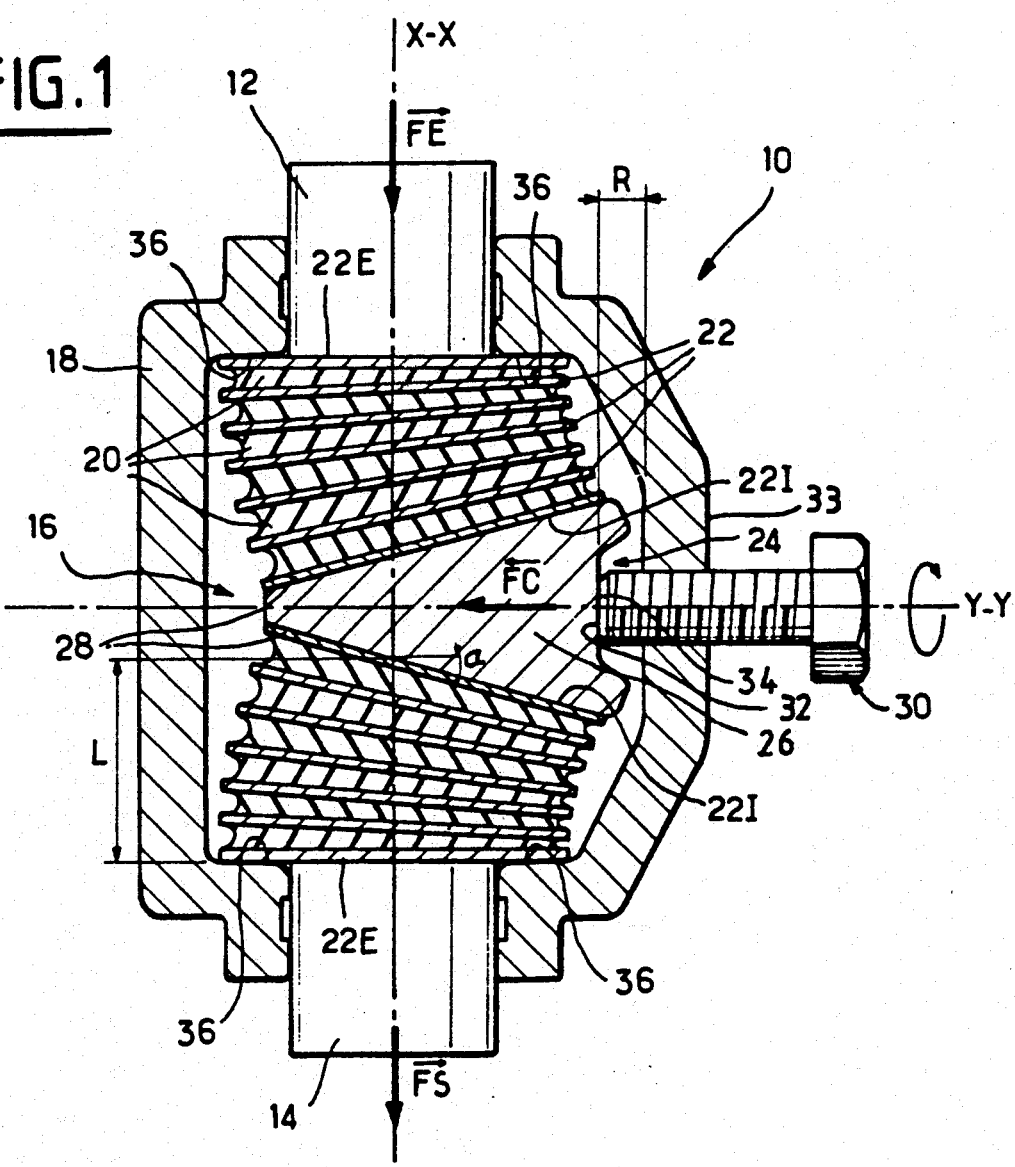
FIG. 1 is a sectional view of a diagrammatic representation of an exemplary embodiment of a force transmission device according to the invention.

The force transmission device 10 illustrated in FIG. 1 comprises a force input member 12 and a force output member 14, to which the input member 12 transmits the input force FE, exerted on it, by way of an elastically deformable force transmission block 16.

The two members 12 and 14 are aligned and mounted slideably in their common direction X—X in a housing 18 of the device 10.

The device 10 thus makes it possible to transmit forces in the main direction X—X of the housing 18.

The force transmission block 16 consists of two opposite parts symmetrical relative to a mid-plane of the housing which is perpendicular to the direction X—X and the line Y—Y of which can be seen in FIG. 1.

Each of the two parts, the upper and the lower parts as seen in FIG. 1, consists of a stack of thin slices or layers 20 of elastically deformable material and of rigid plates 22.

The material of the layers 20 is, for example, an elastomer. Adhesively bonded to the opposite parallel faces of each of the layers 20 are the corresponding faces of the plates 22, each of which is cut out from a metal strip.

The notion of parallelism of the faces is to be understood as excluding the deformation attributable to the control member of the device, as will be explained later.

The deformable layers 20 are of very small thickness, so as to support high pressures when compressive forces are exerted on them in the direction X—X.

According to the invention, the device 10 comprises a member for exerting a control force FC on the force transmission block 16.

The member 24 comprises a wedge 26 which is interposed between the mutually confronting free faces of the two opposite inner rigid plates 22I of the two parts of the force transmission block 16.

The plates 22I interact with the opposite inclined faces 28 of the control wedge 26. Each inclined face 28 forms the same angle "a" relative to the direction Y—Y.

The control wedge 26 is capable of being displaced in the direction Y—Y of exertion of the control force FC, which is perpendicular to the main force transmission direction X—X and substantially parallel to the opposite end faces of the force transmission block 16 which consist of the free faces of the two outer rigid plates 22E of the two parts of the force transmission block 16.

The means for displacing the wedge 26 and therefore for exerting the control force FC are represented diagrammatically in the form of a control screw 30, the body of which is mounted screwed in the lateral wall 33 of the housing 18 and the free end 32 of which interacts with a confronting plane face 34 of the wedge 26.

The rotation of the screw in one direction or the other brings about the putting under more or less high compression of each of the two parts of the transmission block 16, the opposite end faces 22E of which are in abutment against opposite reaction surfaces 36 of the inner wall of the housing 18.

Each axial position of the control wedge 26 determines, for the transmission block 16 as a whole, a prestressed state and therefore a value of the rigidity of the transmission block 16 in the direction X—X.

Because the transmission block 16 is designed in the form of a stack of layers 20 and of plates 22, it is possible to obtain a non-linear law of variation of the rigidity of the transmission block 16.

Figure 2:
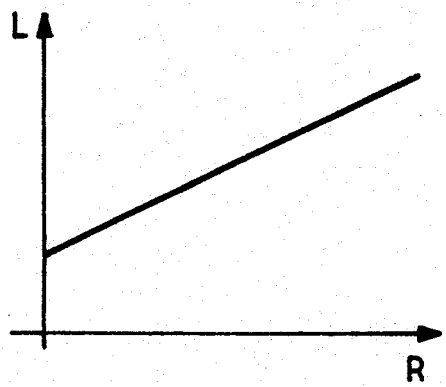
FIGS. 2 and 3 are graphs illustrating the force transmission functioning and behaviour of the device of FIG. 1.

If FC varies, the behaviour of the transmission block 16 is illustrated in FIG. 2, in which it can be seen that the variation in the dimension R (see FIG. 1) causes a substantially proportional variation in the length L of each of the two parts of the block in the direction X—X (see FIG. 1).

Figure 3:
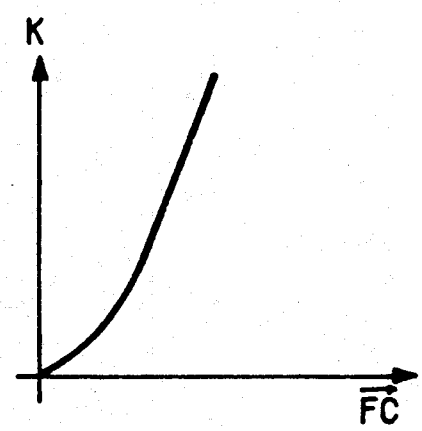
Figure 5:
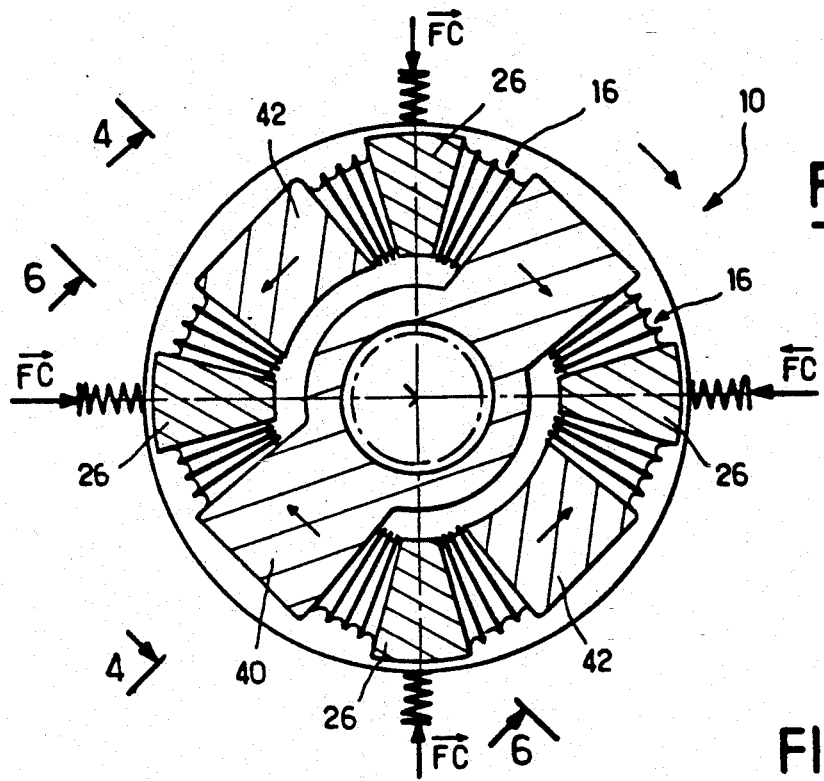
FIG. 5 is a sectional view along the line 5—5 of FIG. 4.

The force transmission behaviour of the device 10 is illustrated in FIG. 3, in which it can be seen that the rigidity K of the device varies according to a non-linear law as a function of the value of the control force FC.

By controlling the value of the control force FC by any suitable means, a control of the rigidity of the force transmission device 10 in the direction X—X is obtained.

The device illustrated in FIGS. 4 to 7 illustrates the adaptation of controlled-rigidity force transmission blocks to the transmission of torques.

The input 12 and output 14 members are two substantially coaxial members of common axis Z—Z, about which they are capable of being displaced in rotation relative to one another.

The input member 12 comprises a series of radial tabs 40, of which there are two here, and likewise the output member 14 comprises transmission tabs 42 which are offset radially relative to the axis Z—Z and which extend axially between the transmission tabs 40.

Between each pair formed by a radial tab 40 and an associated axial tab 42 is a force transmission block 16 with its control wedge 26.

The control wedges 26 are capable of being displaced radially, for example by a device of the chuck type (not shown), so as to exert a control force FC on each of the radial-displacement wedges 26.

As a result of its circular arrangement, the device 10 is "looped", and there is therefore no need for a housing, the reaction surfaces 36 of FIG. 1 being replaced in their function by the mutually confronting opposite surfaces of the tabs 40 and 42.

In this case, the outer ring of a control chuck for the control wedges 26 functions as a reaction component for the exertion of the radial control forces FC, in the same way as the lateral wall 33 of the housing serves as reaction for the screw 30.

Figure 7:
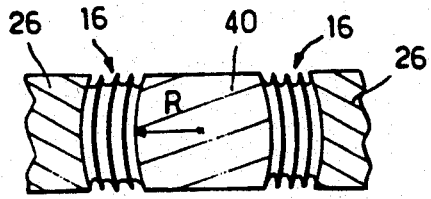
FIG. 7 is a view similar to that of FIG. 6, illustrating an alternative version of a design detail of the device shown in FIGS. 4 to 6.
Figure 6:
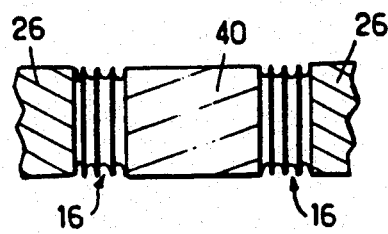
FIG. 6 is a sectional view along the line 6—6 of FIG. 5.
Figure 4:
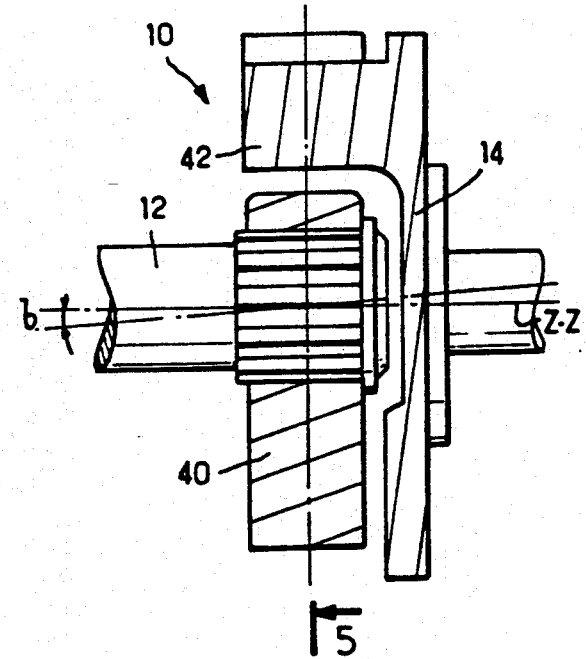
FIG. 4 is a sectional view, along the line 4—4 of FIG. 5, of a diagrammatic representation of an exemplary embodiment of a torque transmission device according to the teachings of the invention.

In the variant of FIG. 7, the transmission surfaces of the tabs are slightly convex, for example spherical, as are the layers and plates 20 and 22, in order to allow a slight angling "b" of one member in relation to the other.

This articulation effect between the two members 12 and 14 is obtained for two pairs of tabs by giving the transmission surfaces of the tabs 40 and 42 the same convex profile.

It is also possible to increase the number of tabs 40 and 42.

As an alternative (not shown), it is possible, of course, to displace the wedges 26 in a direction parallel to the axis Z—Z by means of a control member which is common to the force transmission blocks 16, is coaxial with the members 12 and 14 and is capable of being displaced axially relative to one of these two members.

This axial-displacement control member can, for example, take the form of a stage which is actuated axially by means of a force of mechanical, hydraulic or electromagnetic origin and one radial face of which comprises the wedges 26 which extend from this face in the direction of the force transmission blocks. In this case, the reaction to the control force FC is supported by that of the two members 12 and 14 which carries the axial-displacement control member.

Any law of control of the control force FC can be selected according to the uses of the device and to the type of exertion means available for producing this control force.

I claim:

1. Device for the mechanical transmission of forces between a first input element and a second output element, characterized in that it comprises an input member (12) connected to the first element, an output member (14) connected to the second element and a force transmission block (16) which is interposed between these two members (12, 14) and is capable of experiencing elastic deformation under the action of the compressive forces exerted on it by the two members when these are displaced relative to one another in a main force transmission direction (X—X), and in that it comprises means (24) for controlling the rigidity of the force transmission block (16) along a predetermined rate curve in the direction (X—X) by exerting a control force (FC) on it.

2. The device according to claim 1 wherein the control force (FC) is exerted on the force transmission block (16) in a direction (Y—Y) different from the said main direction (X—X).

3. The device according to claim 2 wherein the force transmission block (16) comprises two plane opposite end faces (22E) which each interact respectively with the input member (12) and the output member (14), and in that the direction (Y—Y) of the control force is substantially parallel to the said end faces (22E).

4. The device according to claim 3 wherein the force transmission block (16) comprises at least one central layer (20) of elastically deformable material, to the opposite faces of which are fastened two rigid end plates (22E) which delimit the said end faces of the force transmission block (16).

5. The device according to claim 4 wherein the force transmission block (16) comprises a stack of layers of elastically deformable material (20), arranged between rigid plates (22).

6. The device according to claim 4 wherein each layer of elastically deformable material (20) is a thin layer of elastomeric material, and in that each rigid plate (22, 22E, 22I) is a metal plate adhesively bonded to the elastomeric material.

7. The device according to claim 3 wherein the two end faces (22E) of the transmission block are respectively in abutment against two mutually confronting reaction surfaces (36) of the device, and in that it comprises a wedge-shaped member (26) for exerting the control force (FC), which penetrates into the transmission block (16) in order to bring about the putting under compression, by a wedge effect, of the two opposite parts of the force transmission block (16), each of which is delimited, on the one hand, by one of the two end faces (22E) of the force transmission block (16) and, on the other hand, by the corresponding inclined face (28) of the member (26) for exerting the control force (FC).

8. The device according to claim 7 wherein the two inclined faces (28) of the member for exerting the control force (FC) form the same angle (a) relative to the main force transmission direction (X—X).

9. The device according to claim 8 wherein the control-force exertion member (26) is interposed between two rigid plates (22I) of the force transmission block (16).

10. The device according to claim 5 wherein each layer of elastically deformable material (20) is a thin layer of elastomeric material, and in that each rigid plate (22, 22E, 22I) is a metal plate adhesively bonded to the elastomeric material.

11. The device according to claim 7 wherein the force transmission block (16) comprises at least one central layer (20) of elastically deformable material, to the opposite faces of which are fastened two rigid end plates (22E) which delimit the said end faces of the force transmission block (16).

12. The device according to claim 7 wherein the force transmission block (16) comprises a stack of layers of elastically deformable material (20), arranged between rigid plates (22).

13. The device according to claim 11 wherein each layer of elastically deformable material (20) is a thin layer of elastomeric material, and in that each rigid plate (22, 22E, 22I) is a metal plate adhesively bonded to the elastomeric material.

14. The device according to claim 12 wherein each layer of elastically deformable material (20) is a thin layer of elastomeric material, and in that each rigid plate (22, 22E, 22I) is a metal plate adhesively bonded to the elastomeric material.

15. The device according to claim 9 wherein the force transmission block (16) comprises a stack of layers of elastically deformable material (20), arranged between rigid plates (22).

* * * * *